US012404819B2

(12) United States Patent
Sliwa et al.

(10) Patent No.: US 12,404,819 B2
(45) Date of Patent: Sep. 2, 2025

(54) INTERNAL COMBUSTION ENGINE

(71) Applicant: DEUTZ Aktiengesellschaft, Cologne (DE)

(72) Inventors: Marco Sliwa, Siegburg (DE); Thomas Werner, Cologne (DE)

(73) Assignee: Deutz Aktiengesellschaft, Cologne (DE)

( * ) Notice: Subject to any disclaimer, the term of this patent is extended or adjusted under 35 U.S.C. 154(b) by 0 days.

(21) Appl. No.: 18/378,771

(22) Filed: Oct. 11, 2023

(65) Prior Publication Data

US 2024/0125282 A1 Apr. 18, 2024

(30) Foreign Application Priority Data

Oct. 13, 2022 (DE) ..................... 10 2022 003 904.4

(51) Int. Cl.
*F02F 1/36* (2006.01)
*F02F 1/10* (2006.01)
*F01P 3/02* (2006.01)

(52) U.S. Cl.
CPC ................ *F02F 1/36* (2013.01); *F02F 1/102* (2013.01); *F01P 2003/024* (2013.01); *F01P 2003/028* (2013.01)

(58) Field of Classification Search
CPC ........ F02F 1/36; F02F 1/12; F02F 1/10; F02F 1/14; F02F 7/0007; F01P 3/00; F01P 3/02;

(Continued)

(56) References Cited

U.S. PATENT DOCUMENTS 4,212,270 A * 7/1980 Nakanishi ............... F01P 7/165 123/41.46
9,140,176 B2 * 9/2015 Steiner ...................... F01P 5/10

(Continued)

FOREIGN PATENT DOCUMENTS

DE 102015014514 A1 * 5/2017 ................ F01P 3/02
DE 102017003310 A1 * 10/2017 ................ F01P 3/02

(Continued)

OTHER PUBLICATIONS

DE-102017003310-a1 (Year: 2017).*

*Primary Examiner* — Grant Moubry
(74) *Attorney, Agent, or Firm* — Davidson Kappel LLC

(57) ABSTRACT

An internal combustion engine includes a crankcase for rotatably supporting a crankshaft about a crankshaft longitudinal axis. The crankcase comprises a crankcase water jacket, a cylinder head which is connected to the crankcase and comprises a cylinder head water jacket, and a coolant pump for supplying the crankcase water jacket and the cylinder head water jacket with a coolant volume flow. The crankcase water jacket and the cylinder head water jacket are fluidly connected to one another in series. The crankcase water jacket is suppliable with the coolant volume flow by the coolant pump via a crankcase inlet, and the crankcase water jacket is designed such that the coolant volume flow is directed via a crankcase outlet and is transferred in the direction of the cylinder head water jacket. The crankcase inlet and the crankcase outlet are axially spaced apart. The crankcase inlet is arranged on a first longitudinal side of the crankcase.

12 Claims, 6 Drawing Sheets

(58) Field of Classification Search
CPC .......... F01P 5/10; F01P 7/14; F01P 2003/024; F01P 2003/028
See application file for complete search history.

(56) References Cited

U.S. PATENT DOCUMENTS

| | | | | |
|---|---|---|---|---|
| 9,500,115 | B2 * | 11/2016 | Quix | F01P 7/165 |
| 10,934,926 | B2 * | 3/2021 | Steiner | F01M 1/16 |
| 2002/0189558 | A1 | 12/2002 | Batzill et al. | |
| 2003/0111025 | A1 * | 6/2003 | Kim | F02F 1/14<br>123/41.72 |
| 2015/0369167 | A1 * | 12/2015 | Beyer | F02F 1/10<br>123/41.74 |
| 2016/0010533 | A1 * | 1/2016 | Matsumoto | F02F 1/14<br>123/41.08 |
| 2017/0306831 | A1 * | 10/2017 | Craft | F01P 3/14 |
| 2018/0347443 | A1 * | 12/2018 | Boehmer | F02F 1/36 |
| 2020/0232412 | A1 | 7/2020 | Watanabe et al. | |
| 2021/0317770 | A1 * | 10/2021 | Tada | F01P 3/02 |

FOREIGN PATENT DOCUMENTS

| | | | |
|---|---|---|---|
| JP | 2017125445 | | 7/2017 |
| KR | 20070040217 | | 4/2007 |
| WO | WO0183959 | A1 | 11/2001 |
| WO | WO0188359 | A1 | 11/2001 |

* cited by examiner

INTERNAL COMBUSTION ENGINE

This claims the benefit of German Patent Application DE 10 2022 003 904.4, filed on Oct. 13, 2022 which is hereby incorporated by reference herein.

The present disclosure relates to an internal combustion engine having a crankcase water jacket and a cylinder head water jacket which are fluidly connected to each other.

BACKGROUND

Internal combustion engines are subject to high thermal stress in the area of the crankcase and cylinder head. To reduce this thermal stress, modern internal combustion engines are water-cooled. For this purpose, internal combustion engines can comprise a water jacket with a crankcase water jacket and a cylinder head water jacket. The water jacket is regularly integrated into the crankcase or cylinder head during the casting process by inserting casting cores.

JP 2017-125445 A discloses an internal combustion engine having a crankcase water jacket. The crankcase water jacket is supplied with a coolant volume flow by a coolant pump via a crankcase inlet, which is arranged on one front side of the crankcase.

DE 10 2015 014 514 A1 discloses an internal combustion engine with a water jacket comprising a crankcase water jacket and a cylinder head water jacket, which are fluidly connected in series. The crankcase water jacket is fed by an inlet rail with a coolant volume flow. The coolant flow is distributed to multiple outlets in the crankcase water jacket. At each one of these multiple outlets, a portion of the coolant volume flow is transferred directly through the cylinder head gasket to the cylinder head water jacket. This arrangement shows the disadvantage that the design of the transfer from crankcase water jacket to cylinder head water jacket is installation space intensive and prevents additional integration of functional sections into the water jacket.

SUMMARY

Starting from this, an objective of the present disclosure is providing an internal combustion engine that comprises a water jacket optimized for installation space and enables the integration of further functional sections into the water jacket.

To solve a problem underlying the present disclosure, an internal combustion engine is provided comprising: a crankcase for rotatably supporting a crankshaft about a crankshaft longitudinal axis, the crankcase comprising a crankcase water jacket, a cylinder head connected to the crankcase and comprising a cylinder head water jacket, and a coolant pump for supplying the crankcase water jacket and the cylinder head water jacket with a coolant volume flow, the crankcase water jacket and the cylinder head water jacket being fluidly connected to one another in series, wherein the crankcase water jacket is suppliable with an entire coolant volume flow from the coolant pump via a crankcase inlet, and the crankcase water jacket is configured such that the entire coolant volume flow is drained via a crankcase outlet and transferred in the direction of the cylinder head water jacket, and the crankcase inlet and the crankcase outlet are axially spaced apart from one another, wherein the crankcase inlet is arranged on a first longitudinal side of the crankcase.

In the internal combustion engine according to the present disclosure, the coolant volume flow provided by the coolant pump is thus completely drained or discharged from the crankcase water jacket through the crankcase outlet, wherein the complete coolant volume flow has previously flowed through the crankcase water jacket at least in the longitudinal direction. The resulting single outlet of the crankcase water jacket creates free installation space in the internal combustion engine which can be used, for example, to integrate further functional sections of the water jacket.

In one possible embodiment of the internal combustion engine, the crankcase outlet may be arranged on a second longitudinal side of the crankcase. In this way, in addition to the flow through the crankcase water jacket in the longitudinal direction, an additional flow through the crankcase water jacket by the complete coolant volume flow in the transverse direction can be realized. The resulting complete longitudinal-transverse flow of the coolant through the crankcase allows it to be cooled efficiently.

In another possible embodiment of the internal combustion engine, the crankcase may comprise a first cylinder bore and a second cylinder bore separated from each other in the axial direction by a cylinder web section. The crankcase inlet can be arranged in the axial direction on a first side of the cylinder web section, and the crankcase outlet can be arranged on a second side of the cylinder web section opposite the first side.

In another possible embodiment of the internal combustion engine, the crankcase may include a line of cylinder bores, the first cylinder bore delimiting the line of cylinder bores as a first cylinder end bore and the second cylinder bore delimiting the series of cylinder bores as a second cylinder end bore. The first cylinder bore and the second cylinder bore can each be arranged in the axial direction, i.e. in a direction parallel to the longitudinal axis of the crankshaft, between the crankcase inlet and the crankcase outlet, at least in sections.

In another possible embodiment of the internal combustion engine, the cylinder head water jacket can be supplied with at least part of the coolant volume flow by the coolant pump via the crankcase water jacket and a cylinder head inlet. The coolant volume flow can be transferred to the coolant pump via a coolant pump inlet. The cylinder head inlet can be located on the second longitudinal side and the coolant pump inlet can be located on the first longitudinal side of the crankcase.

The cylinder head inlet can also be spaced apart from the coolant pump inlet in the axial direction. The crankcase inlet can be arranged in the axial direction between the coolant pump inlet and the crankcase outlet. The first cylinder bore and the second cylinder bore can each be arranged in the axial direction between the crankcase outlet and the cylinder head inlet, at least in sections.

In one possible embodiment of the internal combustion engine, the crankcase outlet and the cylinder head inlet can be fluidly connected to each other via a longitudinal channel arranged in the crankcase. An oil heat exchanger can be arranged in the longitudinal channel in an oil heat exchanger recess.

In another possible embodiment of the internal combustion engine, the crankcase inlet may open into a crankcase distributor channel. The crankcase distributor channel may be arranged on the first longitudinal side of the crankcase. A crankcase collecting channel disposed on the second longitudinal side of the crankcase may open into the crankcase outlet. The crankcase distributor channel and the crankcase collecting channel can be fluidly connected to each other via at least one cylinder web channel. A width of the crankcase distributor channel may decrease in the axial direction away from the crankcase inlet. A width of the crankcase collecting channel may increase in the axial direction toward the crankcase outlet.

In another possible embodiment of the internal combustion engine, the cylinder head inlet may open into a cylinder head distributor channel. The cylinder head distributor channel can be arranged on the second longitudinal side of the crankcase. A cylinder head collecting channel located on the first longitudinal side of the crankcase can open into the coolant pump inlet. The cylinder head distributor channel and the cylinder head collecting channel can be fluidly connected to each other via at least one cylinder head transverse channel.

A width of the cylinder head distributor channel can decrease in the axial direction away from the cylinder head inlet. A width of the cylinder head collecting channel can increase in the axial direction towards the coolant pump inlet.

The crankcase distributor channel can be located between the cylinder head collecting channel and a plane defined by a cylinder head gasket in the crankcase. The crankcase collecting channel can be arranged in the crankcase between the longitudinal channel and a plane defined by a cylinder head gasket.

BRIEF SUMMARY OF THE DRAWINGS

A possible embodiment of the internal combustion engine according to the present disclosure is explained below with reference to the figures. Herein.

DETAILED DESCRIPTION

Figure 1:
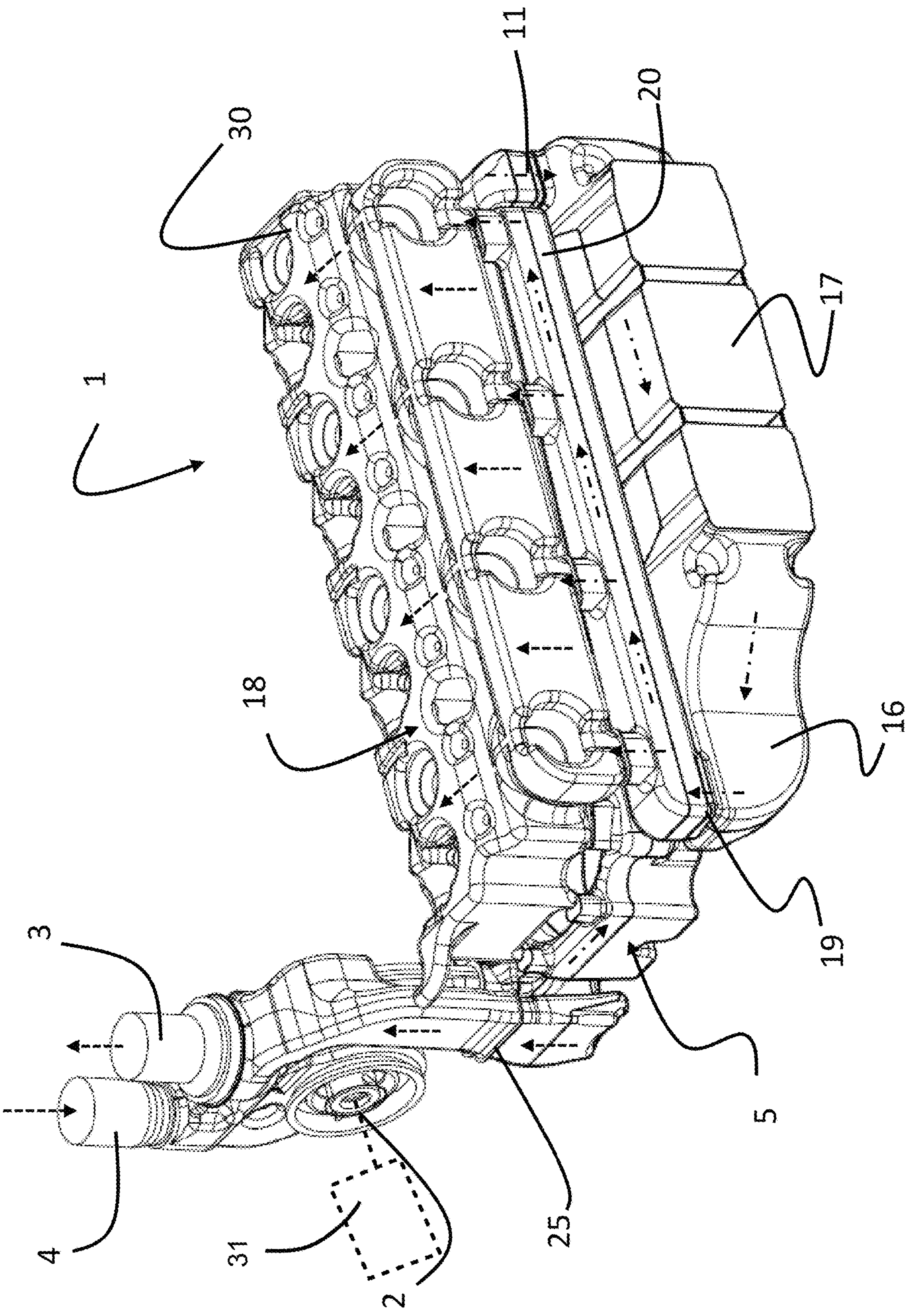
FIG. 1 shows a first perspective view of the water jacket of an internal combustion engine according to the present disclosure.
Figure 2:
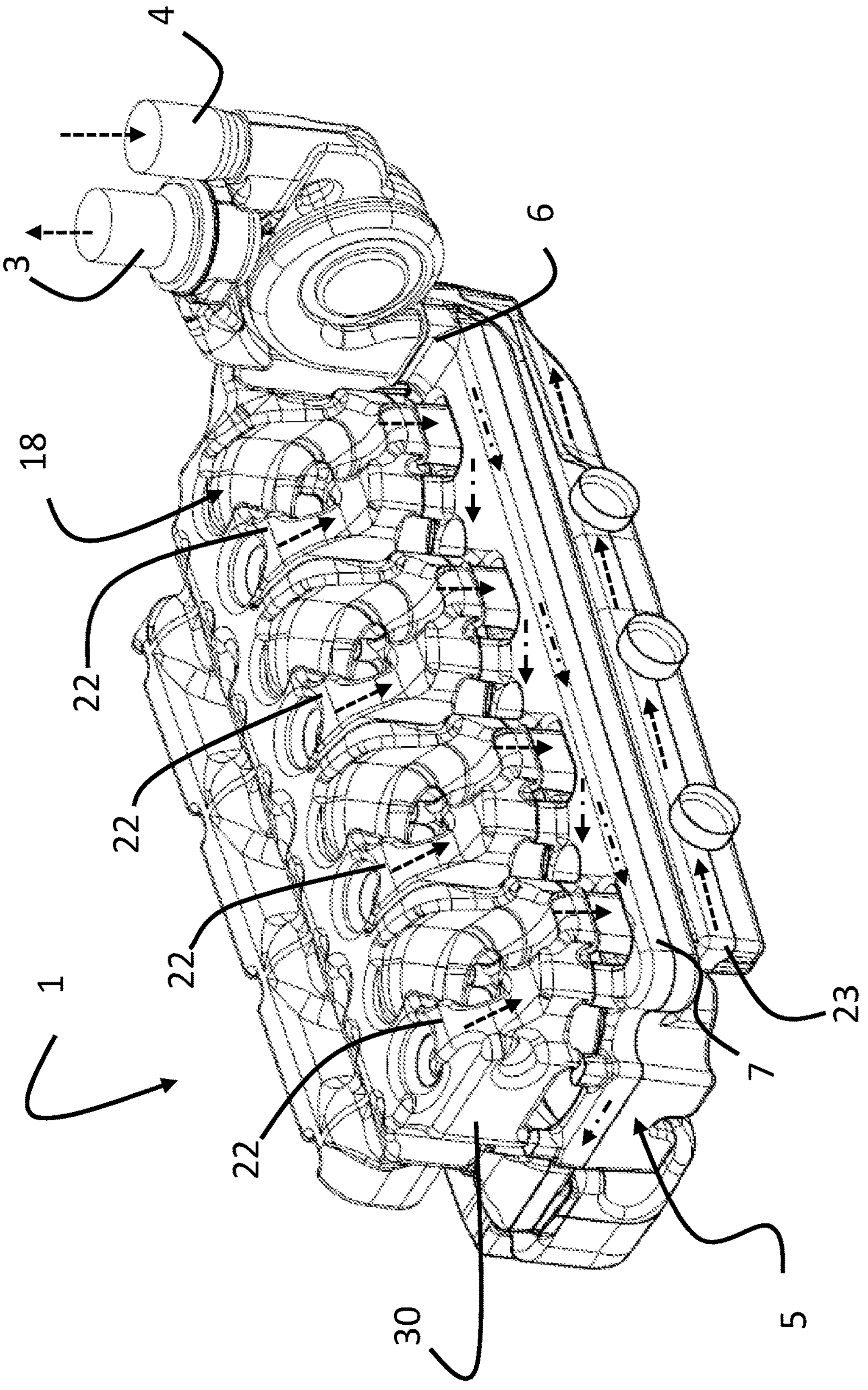
FIG. 2 shows a second perspective view of the water jacket of the internal combustion engine from FIG. 1.
Figure 3:
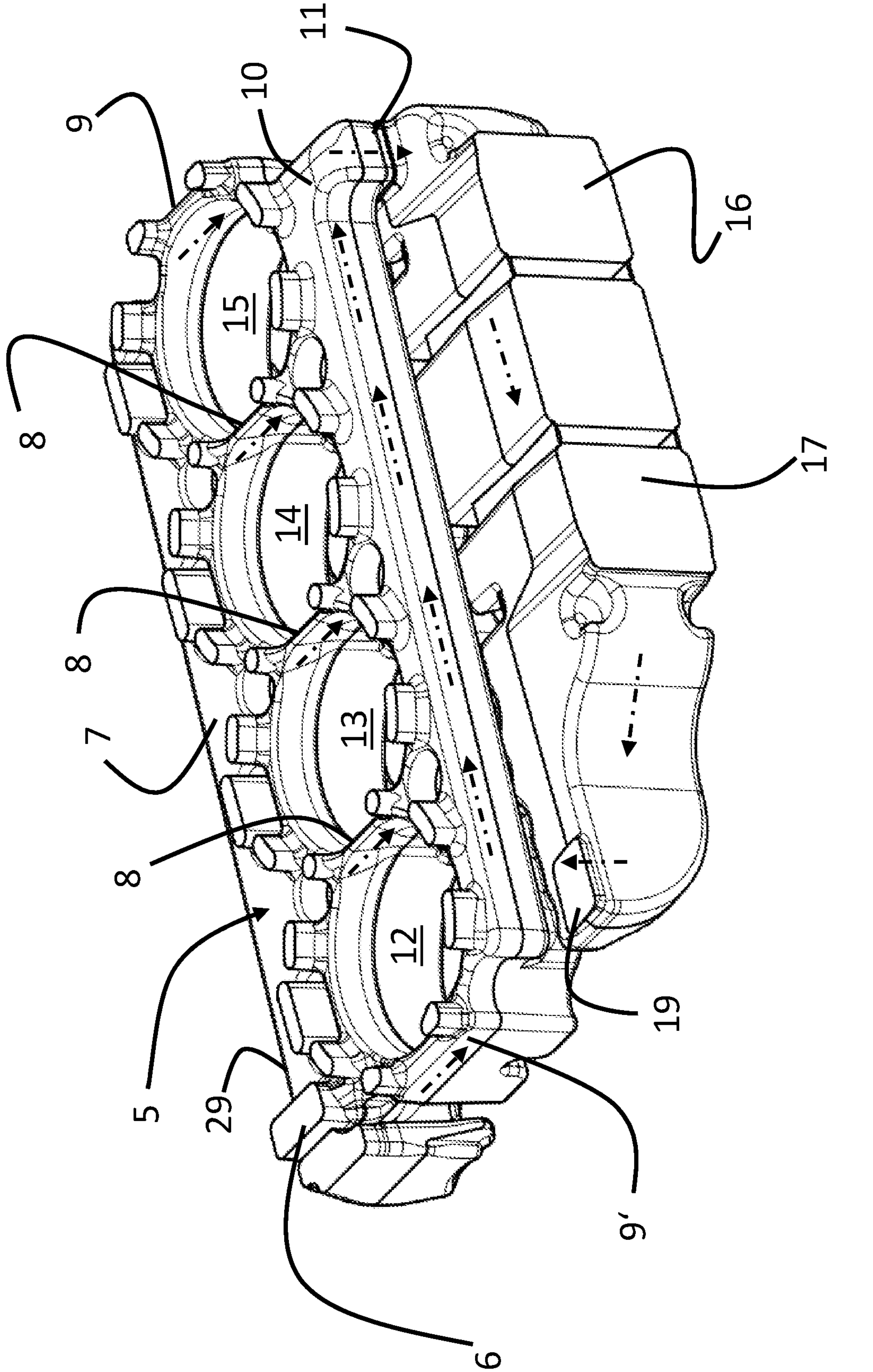
FIG. 3 shows a perspective view of the crankcase water jacket of the internal combustion engine of FIG. 1 together with the longitudinal channel.

FIGS. 1 to 6, which are described together below, show the water jacket 1 of an internal combustion engine according to the present disclosure. In the figures, the water jacket 1 is represented in the manner known to those skilled in the art by the cast cores used. The internal combustion engine according to the present disclosure has a longitudinal axis L_long, which is defined by the crankshaft axis of the internal combustion engine. In the present case, the internal combustion engine is designed as an in-line four-cylinder with a first cylinder bore 12, a second cylinder bore 15, a third cylinder bore 13 and a fourth cylinder bore 14. The first cylinder bore 12 delimits the cylinder line on a first side and may therefore be referred to as the first cylinder end bore. The second cylinder bore 15 delimits the cylinder line on a second side and may therefore be referred to as a second cylinder end bore. The cylinder bores 12, 13, 14, 15 each have parallel cylinder bore axes.

Figure 4:
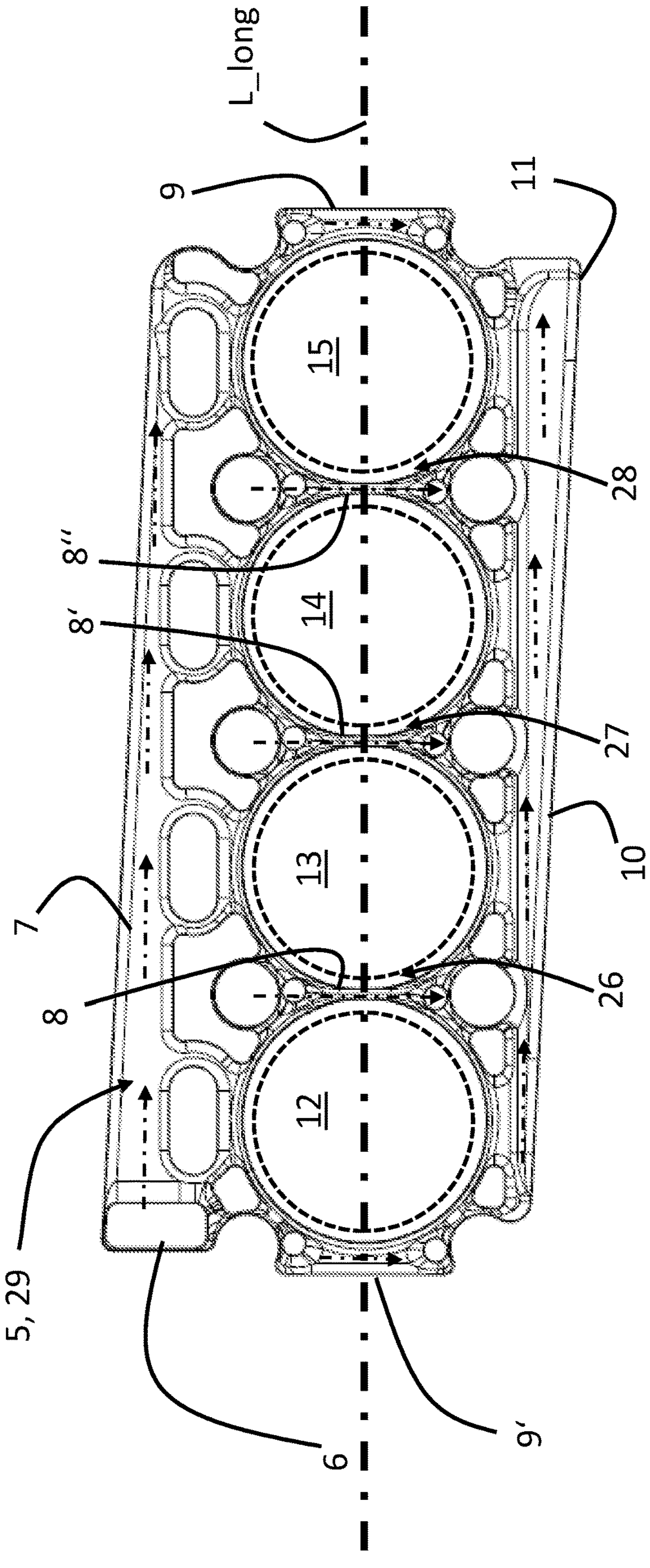
FIG. 4 shows a top view of the crankcase water jacket from FIG. 3.
Figure 5:
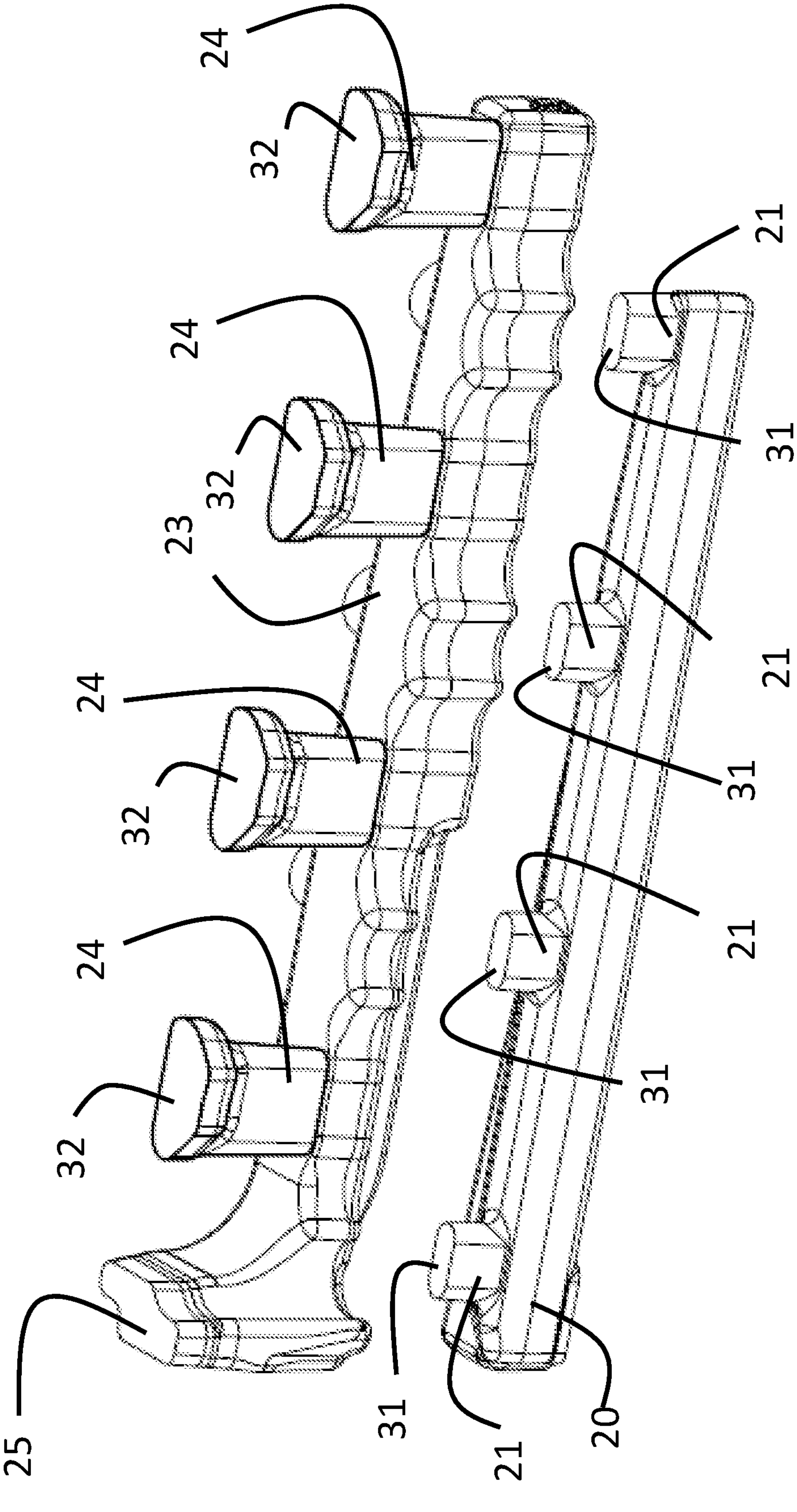
FIG. 5 shows a perspective view of the cylinder head distributor channel and the cylinder head collecting channel.
Figure 6:
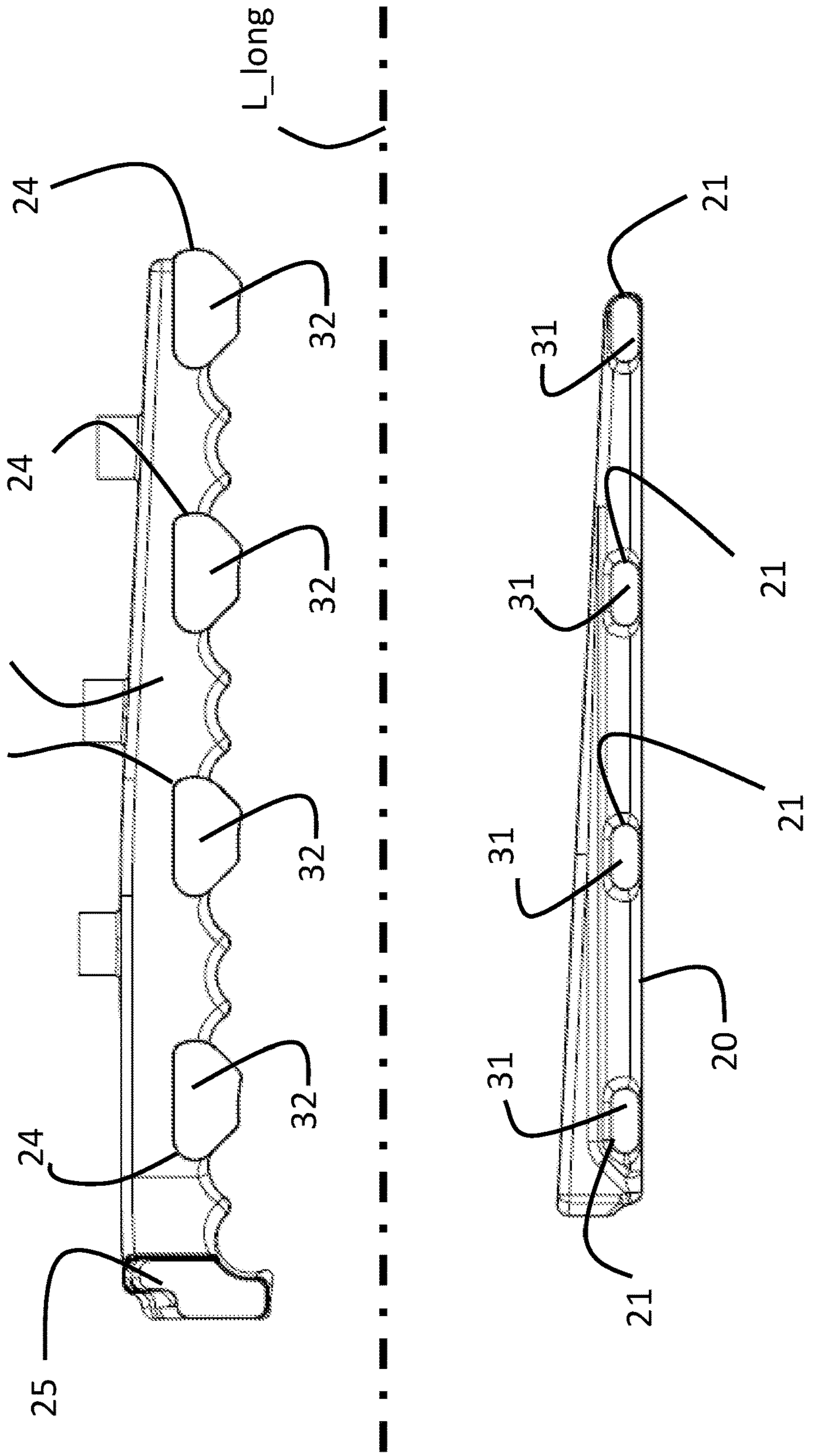
FIG. 6 shows a top view of the cylinder head distributor channel and the cylinder head collecting channel from FIG. 5.

In FIG. 4, cylinder casting cores are indicated as dashed circles in the respective cylinder bores. It can thus be seen that the first cylinder bore 12 and the third cylinder bore 13 are separated from each other by a first cylinder web section 26, the third cylinder bore 13 and the fourth cylinder bore 14 are separated from each other by a second cylinder web section 27, and the fourth cylinder bore 14 and the second cylinder bore 15 are separated from each other by a third cylinder web section 28.

The water jacket 1 includes a crankcase water jacket 5 disposed in the crankcase of the internal combustion engine, and a cylinder head water jacket 18 disposed in the cylinder head of the internal combustion engine. The crankcase and the cylinder head of the internal combustion engine are sealed against each other in a known manner by a cylinder head gasket, which is not shown. In this regard, the cylinder head gasket includes passages that allow fluidic communication between the crankcase water jacket 5 and the cylinder head water jacket 18.

The water jacket 1 of the internal combustion engine represents a circuit which can be flown through by a coolant pump 31. Herein, the crankcase water jacket 5 and the cylinder head water jacket 18 are arranged in series. Starting from the coolant pump 31, the coolant in the direction of flow first flows through the crankcase water jacket 5 before subsequently flowing through the cylinder head water jacket 18. The flow path of the coolant is undoubtedly apparent to the skilled person from FIGS. 1 to 6, the flow of the coolant being indicated by arrows as an supplement. For clarity, the flow of coolant between the coolant pump 31 and the initial entry into the cylinder head water jacket 18 is shown with dashed-dotted arrows, and between the initial entry of coolant into the cylinder head water jacket 18 to the re-entry of coolant into the coolant pump 31 is shown with dashed arrows.

The crankcase water jacket 5 is formed by a crankcase main core 29. A core for a longitudinal channel 16, a core for a cylinder head distributor channel 20 and a core for a cylinder head collecting channel 23 are also arranged in the crankcase.

The cylinder head water jacket 18 is formed by a cylinder head main core 30. The cylinder head main core 30 comprises a section 2 for accommodating the coolant pump 31, a thermostat channel section 3 in which a thermostat can be arranged to control the coolant flow and which forms the inlet to an external cooler, and a suction channel section 4 which supplies the suction side of the coolant pump 31 with coolant and is fluidly connected to the external cooler. In principle, it is also conceivable that the section 2, the thermostat channel section 3 and the suction channel section 4 are designed in a separate core, which is arranged in the crankcase or a separate bracket, for example.

The crankcase main core 29 has a crankcase inlet 6 which is fluidly connected to the pressure side of the coolant pump 31 via a passage in the cylinder head gasket. The crankcase inlet 6 opens into a crankcase distributor channel 7. The crankcase distributor channel 7 tapers at least in sections starting from the crankcase inlet 6 along the longitudinal axis L_long of the internal combustion engine. The crankcase main core 29 also has a crankcase collecting channel 10, which is fluidly connected to the crankcase distributor channel 7 via three web channels 8 as well as a first front channel 9 and a second front channel 9'. A first web channel 8 extends through the first cylinder web section 26, a second web channel 8' extends through the second cylinder web section 27, and a third web channel 8" extends through the third cylinder web section 28. The first front channel 9 extends through a first front wall of the crankcase and the second front channel extends through a second front wall of the crankcase.

The crankcase collecting channel 10 opens into a crankcase outlet 11 and widens at least in sections along the longitudinal axis L_long towards the crankcase outlet 11. In the present case, the crankcase water jacket 5 represents a closed system or closed circuit in the area between the crankcase inlet 6 and the crankcase outlet 11. Thus, an entire flow delivered by the coolant pump 31 to the crankcase inlet 6 is completely directed via the crankcase outlet 11.

The crankcase inlet 6 and the crankcase outlet 11 are spaced from each other along the longitudinal axis L_long. The cylinder bores 12, 13, 14, 15 of the internal combustion engine are arranged at least partially between the crankcase inlet 6 and the crankcase outlet 11 in the direction of the longitudinal axis L_long. In the present case, the third cylinder bore 13 and the fourth cylinder bore 14 are arranged entirely between the crankcase inlet 6 and the crankcase outlet 11. With respect to the longitudinal axis L_long, the first cylinder bore 12 overlaps radially with the crankcase inlet 6, at least in sections. With respect to the longitudinal axis L_long, the second cylinder bore 15 overlaps radially with the crankcase outlet 11, at least in sections. This arrangement of crankcase inlet 6 and crankcase outlet 11 can ensure that the coolant flow passes completely through the crankcase in the longitudinal direction.

The crankcase inlet 6 is arranged on the first longitudinal side of the crankcase, on which the coolant pump 31 is also arranged. The crankcase outlet 11 is arranged on the second longitudinal side of the crankcase, which is opposite the first longitudinal side. This arrangement of crankcase inlet 6 and crankcase outlet 11 can ensure that the crankcase is flowed through by the entire coolant volume flow in a direction transverse to the longitudinal axis L_long. The crankcase is thus flown through longitudinally-transversely by the entire coolant volume flow.

The crankcase outlet 11 opens into a longitudinal channel 16 cast into the crankcase. The longitudinal channel 16 extends from the crankcase outlet 11 in a direction parallel to the longitudinal axis L_long towards a cylinder head inlet 19. In the present case, the cylinder head inlet 19 is arranged in radial overlap with the first cylinder bore 12 with respect to the longitudinal axis L_long.

Between the crankcase outlet 11 and the cylinder head inlet 19, the longitudinal channel 16 comprises a heat exchanger recess 17 in which a heat exchanger, for example a heat exchanger for an oil cooling circuit of the internal combustion engine, can be arranged.

The cylinder head inlet 19 opens into the cylinder head distributor channel 20. The cylinder head distributor channel 20 is cast in the crankcase. At least part of the coolant flow provided by the coolant pump 31 flows through the cylinder head inlet 19. In particular, the complete coolant flow provided by the coolant pump 31 can flow through the cylinder head inlet 19. The cylinder head distributor channel 20 extends in a direction parallel to the longitudinal axis L_long and ends in axial direction in before of the crankcase outlet 11. Thus, the crankcase outlet 11 and the cylinder head distributor channel 20 do not interpenetrate. The cylinder head distributor channel 20 is arranged on the second longitudinal side of the crankcase respectively cast into it. The cylinder head distributor channel 20 has a central section that extends parallel to the longitudinal axis L_long and tapers in the direction of the longitudinal axis L_long away from the cylinder head inlet 19. In the present case, the width of the central section of the cylinder head distributor channel 20 and the width of the crankcase collecting channel 10 change in opposite directions in a direction parallel to the longitudinal axis L_long.

In the present case, the cylinder head distributor channel 20 has four transfer sections 21 extending substantially parallel to the cylinder bore axes. The four transfer sections 21 are evenly spaced apart from each other in the direction of the longitudinal axis L_long. The four transfer sections 21 each end in a transfer opening 31 which cooperate with passages in the cylinder head gasket so that coolant can be transferred from the respective transfer section 21 into the cylinder head water jacket 18.

The cylinder head water jacket 18 includes a plurality of cylinder head transverse channel 22, which are fed with coolant from the transfer sections 21 and extend transversely to the longitudinal axis L_long. The cylinder head water jacket 18 is designed in such a way that the coolant flows through the cylinder head essentially in a direction transverse to the longitudinal axis L_long.

A cylinder head collecting channel 23 is arranged on respectively cast into the first longitudinal side of the crankcase. The cylinder head collecting channel 23 comprises four takeover sections 24 extending substantially parallel to the cylinder bore axes and opening into a central section of the cylinder head collecting channel 23, wherein the central section extends in the direction of the longitudinal axis L_long of the internal combustion engine. The central section of the cylinder head collecting channel 23 widens in the direction of the longitudinal axis L_long toward the coolant pump inlet 25. The width of the central section of the cylinder head collecting channel 23 and the width of the crankcase distributor channel 7, in the present case, change in the same direction parallel to the longitudinal axis L_long.

The takeover sections 24 are uniformly spaced apart from each other in the direction of the longitudinal axis L_long. The takeover sections 24 each terminate in a transfer opening 32 which cooperates with passages in the cylinder head gasket so that coolant can be transferred from the cylinder head water jacket 18 into the respective transfer section 24. The central section of the cylinder head collecting channel 23 opens into a coolant pump inlet 25, through which the coolant is returned past the thermostat and external cooler to the coolant pump 31.

The cylinder head inlet 19 is arranged between the coolant pump inlet 25 and the crankcase outlet 11 in a direction parallel to the longitudinal axis L_long.

The crankcase distributor channel 7 is arranged in the crankcase and in a direction parallel to the cylinder bore axes at least in sections between the cylinder head collecting channel 23 and a plane defined by a cylinder head gasket. In the present case, the crankcase distributor channel 7 is arranged between the central portion of the cylinder head collecting channel 23 and the plane defined by a cylinder head gasket in the crankcase. As can be seen in particular from FIG. 2, the crankcase distributor channel 7 has recesses for this purpose through which the takeover sections 24 of the cylinder head collecting channel 23 extend.

The crankcase collecting channel 10 is arranged in the crankcase and in a direction parallel to the cylinder bore axes at least in sections between the longitudinal channel 16 and the plane defined by the cylinder head gasket.

LIST OF REFERENCE SIGNS

1 Water jacket
2 Section to accommodate a coolant pump

3 Thermostat channel section
4 Suction channel section
5 Crankcase water jacket
6 Crankcase inlet
7 Crankcase distributor channel
8 Web channel
9 Front channel
10 Crankcase collecting channel
11 Crankcase outlet
12 Cylinder bore
13 Cylinder bore
14 Cylinder bore
15 Cylinder bore
16 Longitudinal channel
17 Heat exchanger recess
18 Cylinder head water jacket
19 Cylinder head inlet
20 Cylinder head distributor channel
21 Transfer section
22 Cylinder head transverse channel
23 Cylinder head collecting channel
24 Takeover section
25 Coolant pump inlet
26 Cylinder web section
27 Cylinder web section
28 Cylinder web section
29 Crankcase main core
30 Cylinder head main core
31 Coolant pump
L_long Crankshaft axle

What is claimed is:

1. An internal combustion engine comprising:

a crankcase for rotatably supporting a crankshaft about a crankshaft longitudinal axis, the crankcase comprising a crankcase water jacket;

a cylinder head connected to the crankcase and comprising a cylinder head water jacket; and a coolant pump for supplying the crankcase water jacket and the cylinder head water jacket with a coolant volume flow, the crankcase water jacket and the cylinder head water jacket being fluidly connected to one another in series, the crankcase water jacket being suppliable with an entire coolant volume flow by the coolant pump via a single crankcase inlet, the crankcase water jacket being designed such that the entire coolant volume flow is directed via a single crankcase outlet and is transferred in the direction towards the cylinder head water jacket, the crankcase inlet and the crankcase outlet being axially spaced apart, the crankcase inlet being arranged on a first longitudinal side of the crankcase, wherein the crankcase comprises a first cylinder bore and a second cylinder bore which are separated from one another in the axial direction by a cylinder web section, wherein the crankcase inlet is arranged in the axial direction on a first side of the cylinder web section and the crankcase outlet is arranged on a second side of the cylinder web section opposite the first side, wherein the crankcase comprises a line of cylinder bores, wherein the first cylinder bore delimits the line of cylinder bores as a first cylinder end bore and the second cylinder bore delimits the line of cylinder bores as a second cylinder end bore, wherein the first cylinder bore and the second cylinder bore are each arranged in the axial direction between the crankcase inlet and the crankcase outlet, at least in sections, wherein the cylinder head water jacket is supplied with at least part of the coolant volume flow by the coolant pump via the crankcase water jacket and a cylinder head inlet, and wherein the coolant volume flow is transferred from the cylinder head water jacket via a coolant pump inlet to the coolant pump, wherein the cylinder head inlet is arranged on the second longitudinal side and the coolant pump inlet is arranged on the first longitudinal side of the crankcase.

2. The internal combustion engine according to claim 1, wherein the crankcase outlet is arranged on a second longitudinal side of the crankcase.

3. The internal combustion engine according to claim 1, wherein the cylinder head inlet is arranged at a distance in the axial direction from the coolant pump inlet.

4. The internal combustion engine according to claim 1, wherein the first cylinder bore and the second cylinder bore are each arranged in the axial direction between the crankcase outlet and the cylinder head inlet, at least in sections.

5. The internal combustion engine according to claim 1, wherein the crankcase inlet is arranged in the axial direction between the coolant pump inlet and the crankcase outlet.

6. The internal combustion engine according to claim 1, wherein the crankcase outlet and the cylinder head inlet are fluidly connected via a longitudinal channel in the crankcase, wherein an oil heat exchanger is arranged in an oil heat exchanger recess in the longitudinal channel, in particular.

7. The internal combustion engine according to claim 2, wherein the crankcase inlet opens into a crankcase distributor channel which is arranged on the first longitudinal side of the crankcase; and wherein a crankcase collecting channel, which is arranged on the second longitudinal side of the crankcase, opens into the crankcase outlet;

wherein the crankcase distributor channel and the crankcase collecting channel are fluidly connected to one another via at least one cylinder web channel.

8. The internal combustion engine according to claim 7, wherein a width of the crankcase distributor channel decreases in axial direction away from the crankcase inlet, and wherein a width of the crankcase collecting channel increases in the axial direction toward the crankcase outlet.

9. An internal combustion engine comprising:

a crankcase for rotatably supporting a crankshaft about a crankshaft longitudinal axis, the crankcase comprising a crankcase water jacket;

a cylinder head connected to the crankcase and comprising a cylinder head water jacket; and a coolant pump for supplying the crankcase water jacket and the cylinder head water jacket with a coolant volume flow, the crankcase water jacket and the cylinder head water jacket being fluidly connected to one another in series, the crankcase water jacket being suppliable with an entire coolant volume flow by the coolant pump via a single crankcase inlet, the crankcase water jacket being designed such that the entire coolant volume flow is directed via a single crankcase outlet and is transferred in the direction towards the cylinder head water jacket, and the crankcase inlet and the crankcase outlet being axially spaced apart, the crankcase inlet being arranged on a first longitudinal side of the crankcase, wherein the crankcase outlet is arranged on a second longitudinal side of the crankcase;

wherein the cylinder head inlet opens into a cylinder head distributor channel which is arranged on the second longitudinal side of the crankcase;

wherein a cylinder head collecting channel, which is arranged on the first longitudinal side of the crankcase, opens into the coolant pump inlet; and wherein the cylinder head distributor channel and the cylinder head collecting channel are fluidly connected to one another via at least one cylinder head transverse channel.

10. The internal combustion engine according to claim 9, wherein a width of the cylinder head distributor channel decreases in the axial direction away from the cylinder head inlet, and/or wherein a width of the cylinder head collecting channel increases in the axial direction toward the coolant pump inlet.

11. The internal combustion engine according to claim 9, wherein the crankcase distributor channel is arranged in the crankcase between the cylinder head collecting channel and a plane defined by a cylinder head gasket.

12. The internal combustion engine according to claim 11, wherein the crankcase collecting channel is arranged in the crankcase between the longitudinal channel and the plane defined by the cylinder head gasket.

* * * * *